(12) United States Patent
Veldandi (10) Patent No.: US 10,497,094 B2
(45) Date of Patent: Dec. 3, 2019

(54) METHOD AND APPARATUS FOR MULTI-BAND BLENDING OF A SEAM IN AN IMAGE DERIVED FROM MULTIPLE CAMERAS

(71) Applicant: Nokia Technologies Oy, Espoo (FI)

(72) Inventor: Muninder Veldandi, San Jose, CA (US)

(73) Assignee: Nokia Technologies Oy, Espoo (FI)

( * ) Notice: Subject to any disclaimer, the term of this patent is extended or adjusted under 35 U.S.C. 154(b) by 36 days.

(21) Appl. No.: 15/392,569

(22) Filed: Dec. 28, 2016

(65) Prior Publication Data

US 2018/0182143 A1    Jun. 28, 2018

(51) Int. Cl.
*G06K 9/36* (2006.01)
*G06T 3/40* (2006.01)

(52) U.S. Cl.
CPC .................. *G06T 3/4038* (2013.01)

(58) Field of Classification Search
CPC .................... H04N 1/58; G06T 3/4038; G06T 2207/20221; G06T 2207/10021; G06T 5/50; G06T 2200/32
See application file for complete search history.

(56) References Cited

U.S. PATENT DOCUMENTS

| | | | |
|---|---|---|---|
| 6,359,613 B1 * | 3/2002 | Poole .................... | G05G 9/047 345/156 |
| 6,359,617 B1 | 3/2002 | Xiong | |
| 6,469,710 B1 * | 10/2002 | Shum ..................... | G06T 15/04 345/619 |
| 8,189,031 B2 | 5/2012 | Kim et al. | |
| 8,280,191 B1 | 10/2012 | Avidan et al. | |
| 8,285,076 B2 | 10/2012 | Panetta et al. | |
| 8,509,565 B2 | 8/2013 | Chen | |
| 8,731,330 B2 * | 5/2014 | Sudheendra ............ | G06K 9/34 382/284 |
| 8,811,764 B1 * | 8/2014 | Hsu .......................... | G06T 3/40 382/260 |
| 9,454,803 B1 * | 9/2016 | Hsu .......................... | G06T 3/40 |

(Continued)

OTHER PUBLICATIONS

Video-rate panorama for Free-viewpoint TV, Muhammad Usman Aziz et al., IEEE, 978-1-5090-2491-9, 2016, pp. 228-235 (Year: 2016).*

(Continued)

*Primary Examiner* — Jayesh A Patel
(74) *Attorney, Agent, or Firm* — Alston & Bird LLP (57) ABSTRACT

A method, apparatus and computer program product are provided to combine images captured by multiple cameras into a panoramic image, such as a 360° panorama, in a manner that reduces image defects and other artifacts at or near a seam between images. In some implementations of example embodiments, the overlapping portions of two images are decomposed into a predetermined number of bands. For most of the bands, a laplacian of Gaussian blending mask is applied when blending images associated with the relevant bands. For a final band, a linear blending mask is applied, and the bands are combined into an image that may be used in connection with a panoramic image featuring portions of multiple images captured by an array of cameras. In some example implementations, a bandwidth for the final band may be determined based in part on a selected sharpness factor.

20 Claims, 5 Drawing Sheets

(56) References Cited

U.S. PATENT DOCUMENTS

2005/0063608 A1* 3/2005 Clarke .................. G06T 3/4038
                                                      382/284
2012/0269252 A1  10/2012 Ward
2016/0119541 A1* 4/2016 Alvarado-Moya ... G06T 3/4038
                                                      348/38

OTHER PUBLICATIONS

SURF applied—Stitching, Luo Juan et al., IEEE, 978-1-4244-7249-9, 201'0, pp. 1-5 (Year: 2010).*

Burt, P. J. et al., *A Multiresolution Spline With Application to Imagine Mosaics*, ACM Transactions on Graphics, vol. 2, No. 4 (Oct. 1983) 217-236.

Fukiage, T. et al., *Visibility-Based Blending for Real-Time Applications*, IEEE International Symposium on Mixed and Augmented Reality 2014 Science and Technology Proceedings (Sep. 10-12, 2014) 63-72.

Image Blending and Composition [online] [retrieved Mar. 24, 2017]. Retrieved from the Internet: URL: http://graphics.cs.cmu.edu/courses/15-463/2011_fall/Lectures/blending.pdf>. (dated 2011) 107 pages.

International Search Report and Written Opinion for Application No. PCT/IB2017/057861 dated May 9, 2018, 11 pages.

Aziz, M. U. et al. *Video-Rate Panorama for Free-Viewpoint TV*, 2016 13$^{th}$ Conference on Computer and Robot Vision (CRV), IEEE (Jun. 1, 2016) 228-235.

Juan, L. et al., *SURF Applied in Panorama Image Stitching*, Image Processing Theory Tools and Applications (IPTA), 2010 2$^{nd}$ International Conference, IEEE (Jul. 7, 2010) 5 pages.

* cited by examiner

METHOD AND APPARATUS FOR MULTI-BAND BLENDING OF A SEAM IN AN IMAGE DERIVED FROM MULTIPLE CAMERAS

TECHNICAL FIELD

An example embodiment relates generally to systems that provide for image processing. Example implementations are particularly directed to systems, methods, and apparatuses for combining images captured by multiple cameras into a panoramic image, such as a 360° panorama, in a manner that reduces image defects and other artifacts at or near a seam between images.

BACKGROUND

As viewers of visual media and other content have continued to seek improved media experiences, the use of panoramic views, such as wide-angle views and 360° images and videos, has grown in popularity. The creation and use of panoramic views has become increasingly popular in contexts where a content viewer seeks an immersive viewing experience, such as through the use of virtual reality systems, systems that use a head-mounted display, and other systems configured to present content across a wider field of view than that offered by conventional image viewing systems.

A panoramic view, such as a 360° image or video, for example, may be captured using a plurality of cameras that capture partially overlapping images that can be combined to form a combined image that presents a wider field of view than that available from single-camera systems. However, the combination of multiple images raises a number of technical challenges, particularly in situations where differences between cameras and camera orientations, along with other technical challenges, result in incongruities and other image artifacts at or near the seam between two images. The inventor of the invention disclosed herein has identified these and other technical challenges, and has developed the solutions described and otherwise referenced herein.

BRIEF SUMMARY

A method, apparatus and computer program product are therefore provided in accordance with an example embodiment in order combining images captured by multiple cameras into a panoramic image in a manner that reduces image defects and other artifacts at or near a seam between images. In this regard, the method, apparatus and computer program product of an example embodiment provide for the use of laplacian of Gaussian masks and linear blending masks for selected bands associated with overlapping portions of two images.

In an example embodiment, a method is provided that includes receiving a set of image data associated with region of a first image and a set of image data associated with a region of a second image, wherein the region of the first image and the region of the second image comprise an overlapping portion of the first image and the second image; receiving an indication of a plurality of bands associated with the overlapping portion of the first image the second image; determining a bandwidth associated with a final band within the plurality of bands; calculating, for each band within the plurality of bands, a laplacian image; applying a linear blending mask to a laplacian image associated with the final band within the plurality of bands to form a blended image associated with the final band; applying a laplacian of Gaussian blending mask to each laplacian image associated with each band within the plurality of bands except for the final band to form a plurality of blended images associated with the plurality of bands; and combining the plurality of blended images associated with the plurality of bands with the blended image associated with the final band.

In some example implementations of such a method, determining the bandwidth for the final band comprises calculating the bandwidth based at least in part on a predetermined sharpness factor. In some such example implementations, and in other example implementations, applying the laplacian of Gaussian blending mask to each laplacian image associated with each band within the plurality of band except for the final band to form a plurality of blended images comprises blurring a binary mask with a Gaussian kernel, wherein the Gaussian kernel is associated with a predetermined set of parameters. In some such example implementations, the predetermined set of parameters comprises a mean parameter and a variance parameter. In some such example implementations, and in other example implementations, the method further comprises dividing the blurred binary mask into a first resolution and a second resolution.

In some example implementations of such a method, the indication of the plurality of bands is a predetermined number of bands. In some such example implementations, and in other example implementations, combining the plurality of blended images associated with the plurality of bands with the blended image associated with the final band comprises upscaling and summing the blended images.

In another example embodiment, an apparatus is provided that includes at least one processor and at least one memory that includes computer program code with the at least one memory and the computer program code configured to, with the at least one processor, cause the apparatus to at least receive an indication of a plurality of bands associated with the overlapping portion of the first image the second image; determine a bandwidth associated with a final band within the plurality of bands; calculate, for each band within the plurality of bands, a laplacian image; apply a linear blending mask to a laplacian image associated with the final band within the plurality of bands to form a blended image associated with the final band; apply a laplacian of Gaussian blending mask to each laplacian image associated with each band within the plurality of bands except for the final band to form a plurality of blended images associated with the plurality of bands; and combine the plurality of blended images associated with the plurality of bands with the blended image associated with the final band.

In some example implementations of such an apparatus, causing the apparatus to determine the bandwidth for the final band comprises causing the apparatus to calculate the bandwidth based at least in part on a predetermined sharpness factor. In some such example implementations, and in other example implementations, causing the apparatus to apply the laplacian of Gaussian blending mask to each laplacian image associated with each band within the plurality of band except for the final band to form a plurality of blended images comprises causing the apparatus to blur a binary mask with a Gaussian kernel, wherein the Gaussian kernel is associated with a predetermined set of parameters. In some such example implementations, and in other example implementations, the predetermined set of parameters comprises a mean parameter and a variance parameter. In some such example implementations, the at least one memory and the computer program code are configured to, with the processor, further cause the apparatus to divide the blurred binary mask into a first resolution and a second resolution.

In some example implementations of such an apparatus, the indication of the plurality of bands is a predetermined number of bands. In some such example implementations, and in other example implementations, causing the apparatus to combine the plurality of blended images associated with the plurality of bands with the blended image associated with the final band comprises causing the apparatus to upscale and sum the blended images.

In a further example embodiment, a computer program product is provided that includes at least one non-transitory computer-readable storage medium having computer-executable program code instructions stored therein with the computer-executable program code instructions including program code instructions configured to receive an indication of a plurality of bands associated with the overlapping portion of the first image the second image; determine a bandwidth associated with a final band within the plurality of bands; calculate, for each band within the plurality of bands, a laplacian image; apply a linear blending mask to a laplacian image associated with the final band within the plurality of bands to form a blended image associated with the final band; apply a laplacian of Gaussian blending mask to each laplacian image associated with each band within the plurality of bands except for the final band to form a plurality of blended images associated with the plurality of bands; and combine the plurality of blended images associated with the plurality of bands with the blended image associated with the final band.

In some example implementations of such a computer program product, determining the bandwidth for the final band comprises calculating the bandwidth based at least in part on a predetermined sharpness factor. In some such example implementations, and in other example implementations, applying the laplacian of Gaussian blending mask to each laplacian image associated with each band within the plurality of band except for the final band to form a plurality of blended images comprises blurring a binary mask with a Gaussian kernel, wherein the Gaussian kernel is associated with a predetermined set of parameters, wherein the predetermined set of parameters comprises a mean parameter and a variance parameter. In some such example implementations, the computer-executable program code instructions further comprise program code instructions configured to divide the blurred binary mask into a first resolution and a second resolution.

In some example implementations of such a computer program product the indication of the plurality of bands is a predetermined number of bands. In some such example implementations, and in other example implementations, combining the plurality of blended images associated with the plurality of bands with the blended image associated with the final band comprises upscaling and summing the blended images In yet another example embodiment, an apparatus is provided that includes means for receiving a set of image data associated with region of a first image and a set of image data associated with a region of a second image, wherein the region of the first image and the region of the second image comprise an overlapping portion of the first image and the second image; receiving an indication of a plurality of bands associated with the overlapping portion of the first image the second image; determining a bandwidth associated with a final band within the plurality of bands; calculating, for each band within the plurality of bands, a laplacian image; applying a linear blending mask to a laplacian image associated with the final band within the plurality of bands to form a blended image associated with the final band; applying a laplacian of Gaussian blending mask to each laplacian image associated with each band within the plurality of bands except for the final band to form a plurality of blended images associated with the plurality of bands; and combining the plurality of blended images associated with the plurality of bands with the blended image associated with the final band.

In some example implementations of such an apparatus, determining the bandwidth for the final band comprises calculating the bandwidth based at least in part on a predetermined sharpness factor. In some such example implementations, and in other example implementations, applying the laplacian of Gaussian blending mask to each laplacian image associated with each band within the plurality of band except for the final band to form a plurality of blended images comprises blurring a binary mask with a Gaussian kernel, wherein the Gaussian kernel is associated with a predetermined set of parameters. In some such example implementations, the predetermined set of parameters comprises a mean parameter and a variance parameter. In some such example implementations, the apparatus further includes means for dividing the blurred binary mask into a first resolution and a second resolution.

In some such example implementations, and in other example implementations, the indication of the plurality of bands is a predetermined number of bands. In some such example implementations, and in other example implementations, combining the plurality of blended images associated with the plurality of bands with the blended image associated with the final band comprises upscaling and summing the blended images.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment in order to combine images captured by multiple cameras into a single image, such as a 360° panorama or other panoramic image, for example, in a manner that reduces image defects and other artifacts at or near a seam between adjacent images. In this regard, a panoramic image may be generated, at least in part, by applying a multi-band approach to blending a seam area of two images that are to be stitched together by determining a number of bands to be used in the blending, calculating a bandwidth to be used in the final band, applying a laplacian of Gaussian ("LOG") mask to all of the bands except for the final band, and applying a linear mask to the final band. The blended bands may then be upscaled and summed to create a final image portion for the seam area, which may in turn be combined with the non-seam portions of the underlying images that are used to form the composite panoramic image.

The use of panoramic images formed through the combination of images captured by multiple cameras has become increasingly popular, particularly amongst content creators who seek to create an immersive viewing experience and amongst viewers who seek such immersive viewing experiences. In some contexts, panoramic images are used to present a very wide field of view, such as a 360° view or other wide field of view, for example, to a viewer who is using a specialized viewing device, such as a virtual reality headset and/or other head-mounted display, or another viewing arrangement that is capable of presenting a wide field of view to a viewer.

As such, some example implementations contemplate the use of devices suitable for capturing images used in virtual reality and other immersive content environments, such as Nokia's OZO system, where multiple cameras are placed in an array such that each camera is aimed in a particular direction to capture a particular field of view. Regardless of the particular camera arrangement used in example implementations of the example embodiments described herein, the panoramic view that is generated in accordance with an example embodiment of the present invention is usually based upon images captured by at least two cameras. In the example camera array 100 depicted in FIG. 1, two cameras 101a (which is labeled C1 for the purposes of clarity) and 101b (which is labeled as C2 for the purposes of clarity) are present. While only two cameras are depicted in camera array 100 in FIG. 1, it will be appreciated that, in other example camera arrays, images may be captured by more than two cameras, such as three or more cameras, and then combined to generate a panoramic image. For example, cameras C1 and C2 may be included as a part of a plurality of cameras C1, C2, C3, C4, . . . , $C_n$. Moreover, the plurality of cameras may be arranged such that images captured by C1 and C2 have mutually overlapping portions, images captured by C2 and C3 have mutually overlapping portions, images captured by C3 and C4 have mutually overlapping portions, and images captured by $C_n$ and C1 have mutually overlapping portions, such that when the images are combined, a 360° view is created. A variety of different types of cameras having different fields of view may be used in order to capture the images that can be combined to generate one or more panoramic views. In the example array described herein with respect to FIG. 1, however, each of the cameras 101a and 101b is a fisheye camera having a 180° field of view. Moreover, while each of the cameras 101a and 101b may be the same type of camera and may have a field of view that extends over the same angular range, such as 180°, the cameras used in example implementations of array 100 and/or other arrays may differ from one another and may have different fields of view in other embodiments. For example, one or more of the cameras in an example array may have a field of view greater than 180°, such as a 195° field of view, or a field of view less than 180°.

Figure 1:
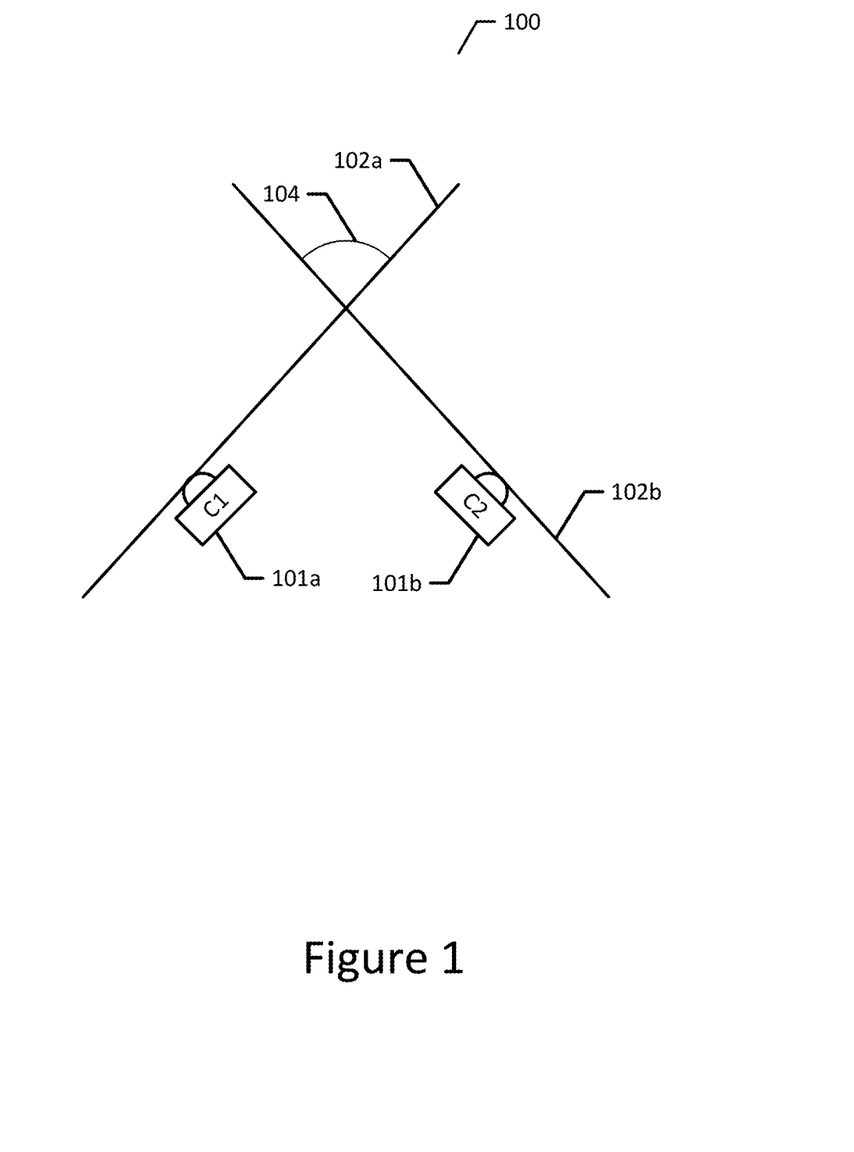
FIG. 1 depicts the respective fields of view of first and second cameras configured to capture images that are processed in accordance with an example embodiment of the present invention.

As shown in FIG. 1, the cameras 101a and 101b are positioned so as to have different fields of view. However, the fields of view of the at least two cameras have a mutually overlapping portion. As shown in FIG. 1, for example, the first camera 101a (or C1) has a 180° field of view as represented by line 102a. Similarly, the second camera 101b (or C2) has a 180° field of view as represented by line 102b. As shown in the example arrangement in FIG. 1, the fields of view of each of the cameras 101a and 101b differ from one another, but share a mutually overlapping portion. In this regard, the fields of view of the first and second cameras overlap in the region designated 104 in FIG. 1. While the example array 100 depicted in FIG. 1 shows the cameras 101a and 101b as being arranged in a symmetrical relationship such that the first camera 101a and the second camera 101b are disposed at the same angle and spaced by the same distance from the overlapping portion of their respective field of view, the cameras may be differently positioned and oriented in other embodiments.

To form a panoramic image, it is often necessary to stitch the images received from each camera together, such that a viewer can be presented with a continuous, combined image that presents image elements captured by multiple cameras. To allow for the creation of such combined panoramic images, the adjacent cameras within a camera array are often configured and oriented such that portions of their respective fields of view overlap. While the overlapping fields of view ensure that images from adjacent cameras typically allow for the creation of a continuous panoramic image that reflects the entire combined field of view of multiple cameras, such arrangements also pose a number of technical challenges when attempting to establish a seam between two adjacent images in a manner that limits the artifacts and/or other defects that can become visible in image portions at and/or near a seam.

Some such technical challenges are inherent to the orientation and/or calibration of cameras within a multiple-camera array. In many typical situations and contexts, camera calibration is typically performed in a manner that favors infinite scene location. Consequently, objects located relatively near the camera(s) may be subject to parallax effects. In some such situations, and in other situations where two or more cameras have overlapping fields of view, objects and/or other image elements at or near a seam area (such as those that appear in portions of multiple images, for example) may appear as ghosted and/or blurred image artifacts, depending on the approach used to combine the adjacent images. Regardless of the source of image artifacts and/or other defects at the seam area, such artifacts and defects can cause disruptions to the viewing experience, cause the combined panoramic image to depart from the intent of the content creator or director, and/or may be otherwise undesired.

Figure 3:
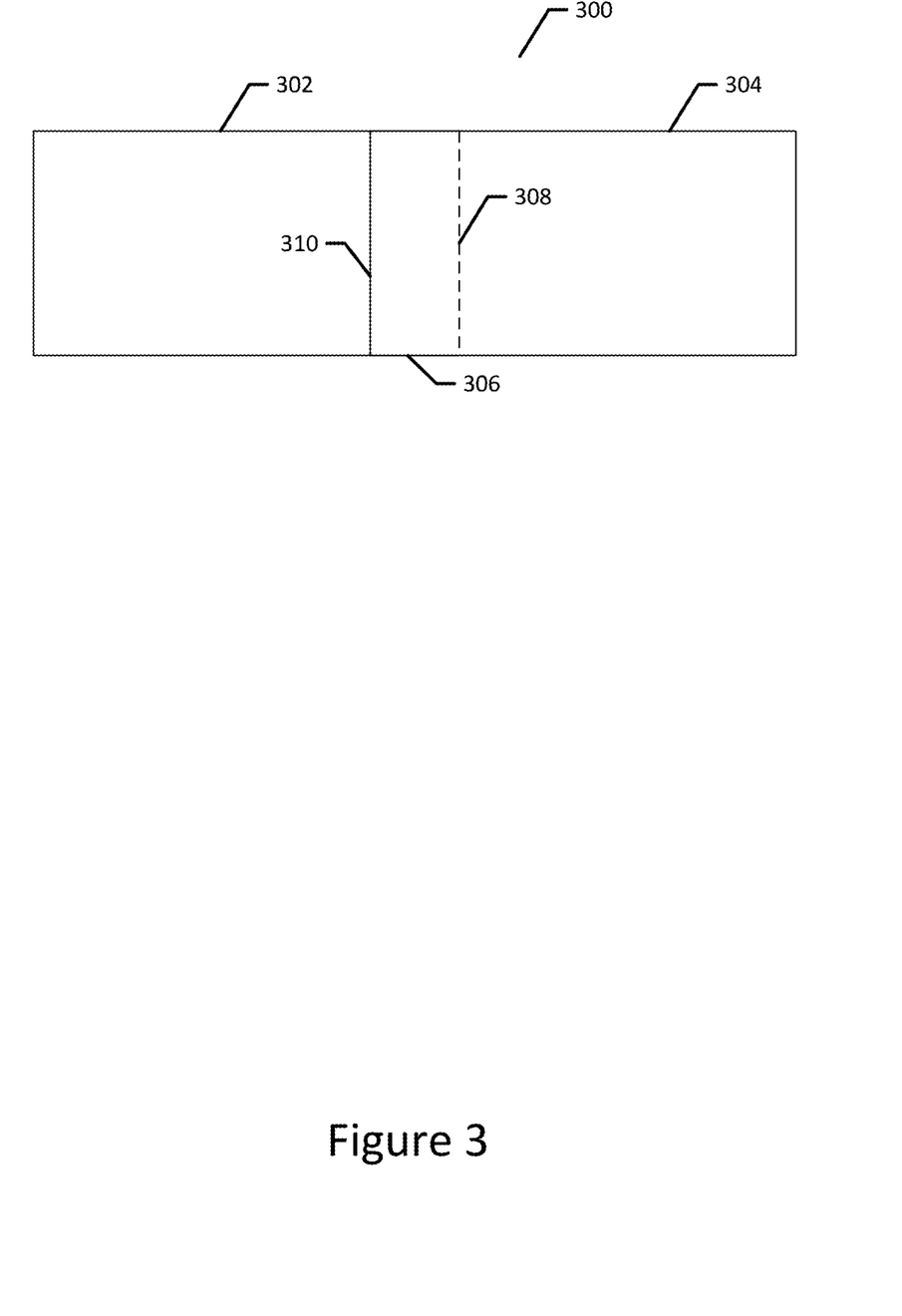
FIG. 3 is a block diagram illustrating example adjacent images and the overlapping portion between such adjacent images.

FIG. 3 depicts an example image pair 300 that reflects a potential arrangement of adjacent images that may be stitched together to form a panoramic image and which may be subject to at least some of the technical challenges described herein. As shown in FIG. 3, example image pair 300 includes a first image 302 and a second image 304. In some example implementations of image pair 300, the first image 302 may be captured by one camera in an array, such as camera 101a shown in FIG. 1, for example, and the second image may be captured by a second camera in the same array, such as camera 101b shown in FIG. 1, for example. The images 302 and 304 are shown in FIG. 3 as having an overlapping portion 306, wherein image elements appear in both the first image 302 and the second image 304. For example, and as shown in FIG. 3, the right edge 308 of image 302 contains image elements that are to the right, for example, of image elements at or near the left edge 310 of image 304, such that the overlapping region 306 is defined in the example presented in FIG. 3 as the area between edges 310 and 308. As shown in FIG. 3, image 304 is shown as being partially overlaid over image 302, such that edge 308 is shown as a dashed line for the purposes of clarity. However, it will be appreciated that FIG. 3 is not necessarily drawn to scale, and that, in some instances, image 302 may be overlaid over image 304. In some example implementations of image pair 300, the overlapping portion 306 may be a product of the camera associated with image 302 having a field of view that intersects and/or otherwise overlaps with the field of the view of the camera associated with the second image 304. For example, and with reference to FIG. 1, the overlapping image portion 306 in FIG. 3 may correspond to at least a portion of the region 104 established by intersecting fields of view 102a and 102b in FIG. 1.

While the overlapping region 306 of example image pair 300 may generally correspond to portions of images 302 and 304 that depict the same image elements, many of the technical challenges addressed herein arise in situations where the appearance of a particular image element differs from image to image. For example, parallax effects, differences in viewing angle between cameras, differences in the distance from each camera to the image element, differences in focal lengths between the two cameras, and/or differences in the image capturing elements of each camera may result in an image element that appears in one image having a different orientation, size, coloring and/or shading, focus, and/or other aspect of its appearance in an adjacent image.

In some example implementations, an OZO camera and/or another camera array is used to capture multiple image. In such example situations, most of the image content is copied to an output panorama, while overlapping regions of images are separately processed to create a blended seam area. In conventional processes, a pyramid and/or multiband blending approach or a two-band blending approach may be used to compute a blended portion of the image, which can then be copied onto the output panorama.

In traditional multiband blending approaches, an overlapping region is typically decomposed into multiple sub-bands at varying resolutions. A binary mask may then be blurred through the application of Gaussian function at varying scales, and applied as a blurring mask to the various sub-bands. In traditional two-band blending, a linear ramp makes is typically applied when blending the overlapping images. Both of these traditional approaches often result in visible artifacts and/or defects in the final output panorama, including ghosted image elements, blurred image elements, and other artifacts and/or defects.

To address at least these technical challenges, example embodiments of the invention described, contemplated, and otherwise disclosed herein provide for multiband image blending for use in image stitching that provides improved results and decreased artifacts and other defects for any configurable number of bands. Some example implementations of such embodiments provide for the use of a configurable number of bands for use in blending the overlapping portion of two images. In some such example implementations, the configurable number of bands may be selected and/or identified by a user. In some other example implementations, the configurable number of bands may be set based at least in part on the bandwidth of one or more bands.

Regardless of how the number of bands is selected and/or otherwise configured, some example implementations involve the identification of a final band within the selected number of bands, and the calculation of a bandwidth to be associated with that band. In some example situations, the bandwidth associated with the final band may be considered to be an optimal bandwidth. The calculation of such an optimal bandwidth may be based, at least in part, on a predetermined sharpness factor and/or another configurable tuning parameter that may be set by a user. In general, the selection of a high sharpness factor will tend to decrease the width of the final band, and will tend to preserve high frequency information in a seam area, but may result in potentially visible bands across the overlap region of a stitched image. In contrast, the selection of a low sharpness factor will generally result in an increased width for the final band, and will tend to provide for a smooth color transition in the overlap area and reduce the likelihood of visible banding in the overlap portion, while potentially resulting in a decrease in overall sharpness in the region surrounding the seam.

In some situations, the bandwidth of the final band may be determined based on a sharpness factor that is selected by a user. In some example implementations within such situations, the bandwidth may be inversely proportional to the sharpness factor. In some such example implementations, a width of a band may be set at 18 pixels (which may be deemed as an optimal setting for a given sharpness factor). This width may be increased if the sharpness factor is decreased, and decreased if the sharpness factor is increased in accordance with the example equation:

(Width_of_Final_Band)=18/(Sharpness_Factor)

It will be appreciated that the example equation above is shown in a simplified form for the purposes of clarity, and some example implementations of embodiments of the invention contemplate more complex equations (such as those that may take into account additional factors, settings, and/or user preferences, for example) that relate the width of the final band to a sharpness factor.

It will also be appreciated that, in some example implementations, there may be a dependency and/or correlation between the band width calculated for the final band (which may be calculated based on an M number of bands selected by a user, for example) is smaller than the optimal bandwidth for the final band in a given situation. In such situations, it may be advantageous to decrease the number of bands from M to M−1 (notwithstanding a user-supplied selection of M bands), and setting the M−1$^{th}$ band as the final band.

Some example implementations contemplate that, after the bandwidth has been selected for the final band, the overlapping regions of the two adjacent images to be combined are divided into multiple laplacian images for each of the bands. In some such example implementations, a binary mask is blurred with a Gaussian kernel. This blurred mask, which may be referred to as a laplacian of Gaussian ("LOG") mask may be further divided into low resolutions to ensure that, for every band except the final band, there is a mask that may be used to blur the laplacian images. After the creation of the multiple blurred masks, the masks may be applied to blur the laplacian images associated with every band except for the final band.

In example implementations of embodiments of the invention, the final band is processed differently than the other bands, at least in the sense that instead of a LOG mask being applied to the final band, a linear mask is used. For example, a linear ramp down mask from 1 to 0 may be used with a portion of a first image, such as image 302 in FIG. 3, for example, that overlaps with a second image, such as image 304 in FIG. 3, for example, while a linear ramp up mask from 0 to 1 may be used with the corresponding overlapping portion of the second image. Stated differently, and with reference to FIG. 3 a linear ramp down mask may be used with over a band of image 302 that is located within overlapping area 306, and a linear ramp up mask may be used over a band of image 304 that is located within overlapping area 306.

Figure 4A:
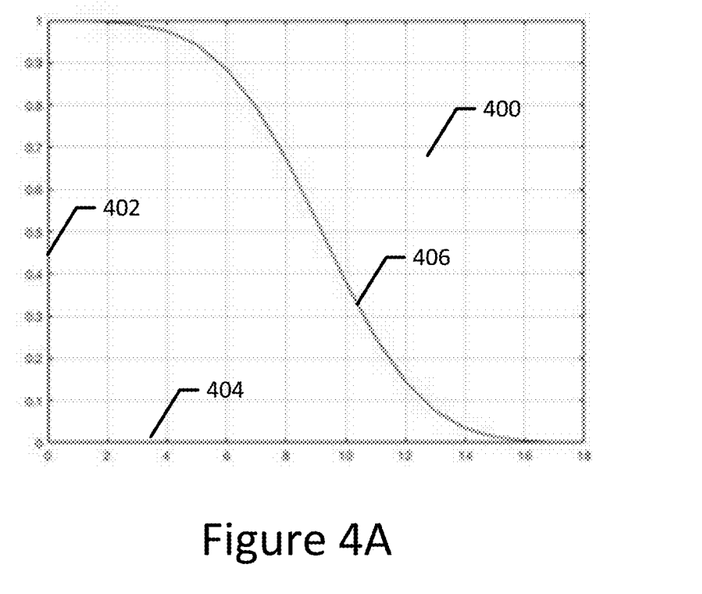
FIG. 4A depicts a graphical representation of a profile of an example laplacian of Gaussian mask that may be used in accordance with example embodiment of the present invention.
Figure 4B:
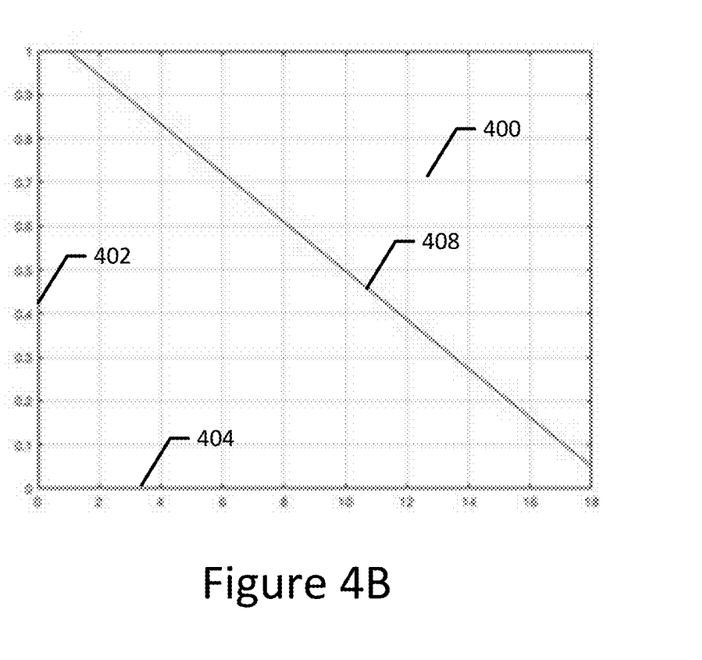
FIG. 4B depicts a graphical representation of a profile of an example linear mask that may be used in accordance with example embodiment of the present invention.

Example graphical representations of a LOG mask and a linear mask are presented at FIGS. 4A and 4B, respectively. As shown in FIG. 4A, graph area 400 is defined by a y-axis 402 (which is shown in the example presented in FIG. 4A as having a scale from a value of zero at the origin to a value of 1) and by an x-axis 404 (which is shown in the example presented in FIG. 4A as representing a number of pixels within a particular band). It will be appreciated that while the example presented in FIGS. 4A and 4B use an 18-pixel bandwidth, other bandwidths may be used, based, for example, on the calculation and/or other setting of a bandwidth disclosed and otherwise contemplated herein. As shown in FIG. 4A, the curve 406 depicts a profile associated with a LOG mask, which may be applied any of a number of bands (except for the final band) associated with a seam area in accordance with example implementations of embodiments of the invention.

In FIG. 4B, the same graph area 400, with the same axes 402 and 404 is used to show a profile 408 of a linear mask, which may be applied to a final band associated with a seam area in accordance with example implementations of embodiments of the invention. It will be appreciated that the selection of different bandwidths and/or other parameters associated with the bands to be used in blending a seam area of multiple images may result in changes to the slope and/or curvature of the profiles 406 and 408 depicted in FIGS. 4A and 4B while still implementing embodiments of the invention disclosed and otherwise contemplated herein.

In some example implementations, after the appropriate masks have been applied to the various bands to create blended bands, the blended bands may be upscaled and summed to provide a final seam area that can be added to a panoramic image and/or otherwise used in connection with the creation of a combined panoramic image.

Figure 2:
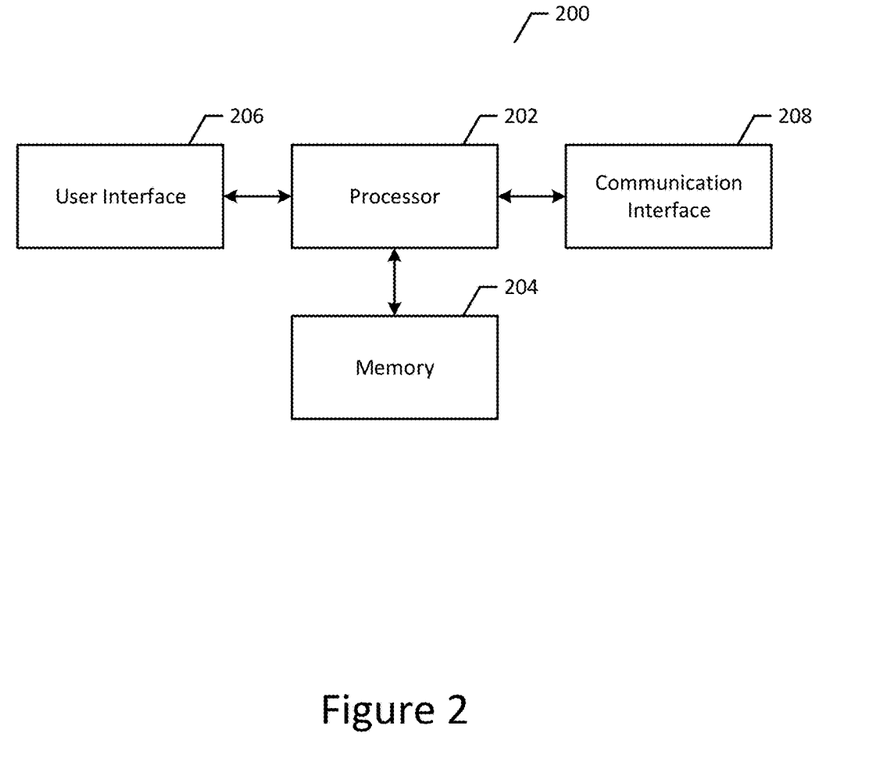
FIG. 2 is a block diagram of an apparatus that may be specifically configured in accordance with an example embodiment of the present invention.

As discussed throughout herein, example embodiments of the invention disclosed and otherwise contemplate herein are directed toward providing improved panoramic images that may be formed by combining multiple images. Based upon the images captured by the cameras 101a and 101b, for example, a panoramic view is generated and combined in accordance with the techniques, approaches, and other developments described herein. In this regard, the panoramic view may be generated by an apparatus 200 as depicted in FIG. 2. The apparatus may be embodied by one of the cameras or may be distributed between the cameras. Alternatively, the apparatus 200 may be embodied by another computing device, external from the cameras. For example, the apparatus may be embodied by a personal computer, a computer workstation, a server or the like, or by any of various mobile computing devices, such as a mobile terminal, e.g., a smartphone, a tablet computer, a video game player, etc. Alternatively, the apparatus may be embodied by a virtual reality system, such as a head mounted display.

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Figure 5:
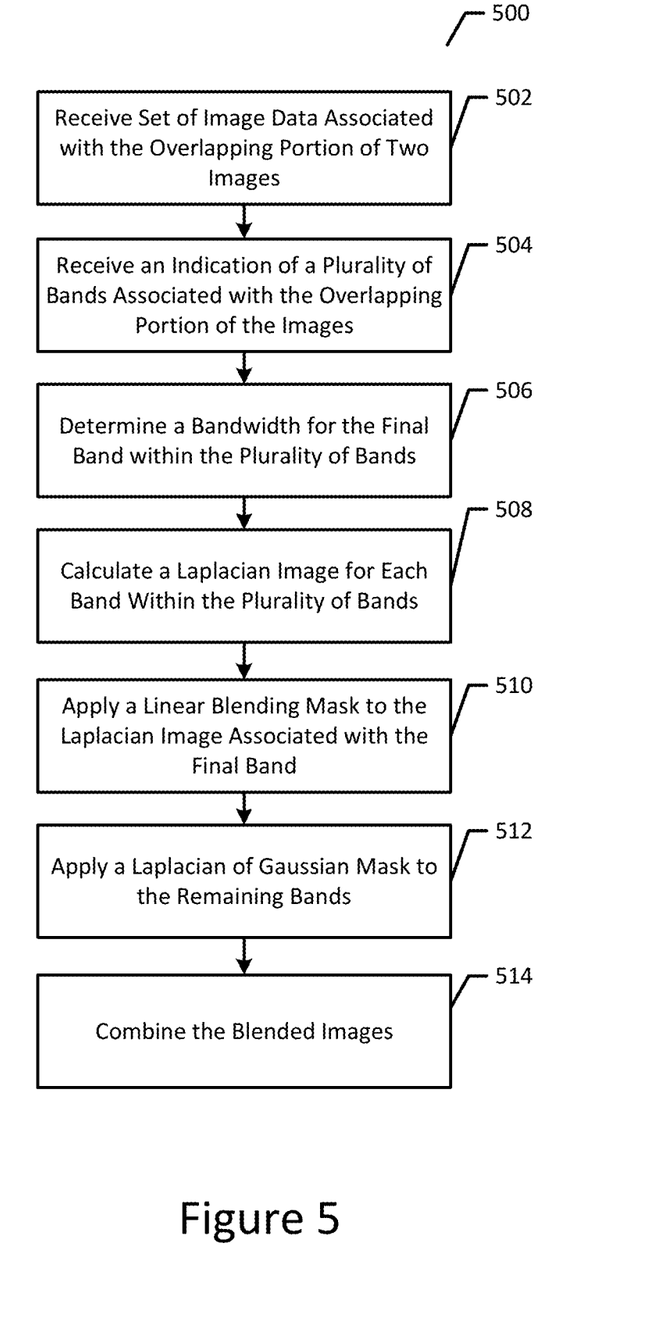
FIG. 5 is a flowchart illustrating the operations performed, such as by the apparatus of FIG. 2, in accordance with an example embodiment of the present invention.

Referring now to FIG. 5, the operations performed by the apparatus 200 of FIG. 2 in accordance with an example embodiment of the present invention are depicted as a process flow 500. In this regard, the apparatus includes means, such as the processor 202, the memory 204, the user interface 206, the communication interface 208 or the like, for combining images captured by multiple cameras into a panoramic image, in a manner that reduces image defects and other artifacts at or near a seam between images.

As shown in FIG. 5, the apparatus includes means, such as the processor 202, the memory 204, the user interface 206, the communication interface 208 or the like, for receiving a set of image data associated with region of a first image and a set of image data associated with a region of a second image, wherein the region of the first image and the region of the second image comprise an overlapping portion of the first image and the second image. For example, and with reference to block 502 of FIG. 5, the apparatus 200 of an example embodiment may receive a set of image data associated with the overlapping portion of two images. As discussed herein, example implementations of embodiments of the invention often arise in circumstances where multiple cameras, such as the cameras of an OZO system and/or other implementations of the camera array shown in FIG. 1, for example, are used to capture images that may be stitched together to form a panoramic view. Any approach to receiving sets of image data may be used in connection with example implementations of block 502. In some example implementations of block 502, the images captured by the multiple cameras have at least some overlapping portions. In some such example implementations, it may be computationally efficient to pass portions of the captured images that do not overlap with other images directly to an output image, while the image data associated with the overlapping portions of the images may be processed in accordance with the processes, approaches, and/or other techniques disclosed and otherwise contemplated herein to blend the seam area of the overlapping images in a manner that features few, if any, visible artifacts or other defects.

The apparatus also includes means, such as the processor 202, the memory 204, the user interface 206, the communication interface 208 or the like, for receiving an indication of a plurality of bands associated with the overlapping portion of the first image the second image. For example, and with reference to block 504 of FIG. 5, the apparatus 200 of an example embodiment may receive an indication of a plurality of bands associated with the overlapping portion of the images. As described herein, example implementations of embodiments of the invention contemplate the use of an advanced multi-band blending of overlapping portions of images to establish a seam and/or other transition from one image to an adjacent image in a panoramic view. In some example implementations, the indication of the plurality of bands is a predetermined number of bands, which, in some situations, may be input by a user. However, any approach to setting a number of bands associated with the overlapping portion of two images may be used in example implementations of block 504, and in some example implementations, the number of bands may be preset, such as in software, hardware, and/or firmware, or otherwise established without needing input from a user.

The apparatus also includes means, such as the processor 202, the memory 204, the user interface 206, the communication interface 208 or the like, for determining a bandwidth associated with a final band within the plurality of bands. For example, and with reference to block 506 of FIG. 5, the apparatus 200 of an example embodiment may determine a bandwidth for the final band. As described and otherwise contemplated herein, example implementations of embodiments of the invention contemplate the use of multiple bands and the use of different processing for the final band than the processing used for the other bands associated with an overlapping portion of two images. Any of the approaches to determining a bandwidth associated with the final band described or otherwise contemplated herein may be used in connection with example implementations of block 506. In some example implementations, determining the bandwidth for a final band includes calculating the bandwidth based at least in part on a predetermined sharpness factor. As discussed herein, in some situations, a sharpness factor may be set by a user and/or otherwise acquired by the apparatus 200 and used to set the width of the final band. In such example situations, the sharpness factor may be used in connection with determining an optimal bandwidth for the final band, and may, in some situations exhibit an inverse relationship with the width of the final band.

The apparatus also includes means, such as the processor 202, the memory 204, the user interface 206, the communication interface 208 or the like, for calculating, for each band within the plurality of bands, a laplacian image. For example, and with reference to block 508 of FIG. 5, the apparatus 200 of an example embodiment may calculate a laplacian image for each band within the plurality of bands. Any approach to calculating a laplacian image and/or transforming an image into a laplacian image may be used in connection with example implementations of block 508. For example, in some example implementations, the overlapping region of two adjacent images are divided into multiple laplacian images at levels associated each of the bands associated with the images. In some situations, the calculating and/or transforming multiple bands of the overlapping portion of two images allow for the improved blending and combining of the two images contemplated herein. In some such situations, it may be advantageous to decompose the images into multiple sub-bands at varying resolutions prior to applying one or more blending masks.

The apparatus also includes means, such as the processor 202, the memory 204, the user interface 206, the communication interface 208 or the like, for applying a linear blending mask to a laplacian image associated with the final band within the plurality of bands to form a blended image associated with the final band. For example, and with reference to block 510 of FIG. 5, the apparatus 200 of an example embodiment may apply a linear blending mask to the laplacian image associated with the final band. As discussed herein, example embodiments of the invention disclosed and otherwise contemplated herein involve the use of a linear blending mask for a final band associated with an overlapping portion of two images, and the use of a LOG blending mask with the remaining bands. Any approach to developing a linear blending mask and applying such a mask to an image may be used in connection with example implementations of block 510, including but not limited to those discussed herein with respect to FIG. 4A. In some situations, it may be advantageous to apply a linear ramp down mask to one image associated with an overlapping portion of two images, and apply a linear ramp up mask to the corresponding image when operating on the final band.

The apparatus also includes means, such as the processor 202, the memory 204, the user interface 206, the communication interface 208 or the like, for applying a laplacian of Gaussian blending mask to each laplacian image associated with each band within the plurality of bands except for the final band to form a plurality of blended images associated with the plurality of bands. For example, and with reference to block 512 of FIG. 5, the apparatus 200 of an example embodiment may apply a laplacian of Gaussian mask to the remaining bands. Any approach to developing one or more LOG blending masks and applying such masks to an image may be used in connection with example implementations of block 512, including but not limited to those discussed herein with respect to FIG. 4A. In some example implementations of block 514, applying the LOG blending mask comprises blurring a binary mask with a Gaussian kernel. In some such example implementations, the Gaussian kernel may be associated with a predetermined set of parameters, such as a mean, a variance, or another parameter related to an aspect of the Gaussian kernel. In some example implementations, it may be advantageous to further divide the blurred binary mask into a first resolution and a second resolution. In some such example implementations, dividing the blurred mask into multiple resolutions, such as low resolutions, for example, may provide for an available mask in every band that can be used for blurring the images associated with such bands.

The apparatus also includes means, such as the processor 202, the memory 204, the user interface 206, the communication interface 208 or the like, for combining the plurality of blended images associated with the plurality of bands with the blended image associated with the final band. For example, and with reference to block 514 of FIG. 5, the apparatus 200 of an example embodiment may combine the blended images. Any approach to combining images, such as techniques applicable to laplacian images associated with one or more bands, for example, may be used in connection with example implementations of block 514. In some example implementations, it may be advantageous to upscale and sum the blended images, such that the multiple blended images (namely, the images associated with each band that were blurred using a LOG mas and any images associated the final band that were blurred using a linear mask) can be combined to form a blended image area that can be used in connection with an panoramic image. In some example implementations, performing the operations identified in flow 500, typically results in an output image that features fewer visible artifacts and/or defects than output images obtained using conventional techniques, particularly with regards to color transition between images, ghosting, and blurring in the output image.

As described above, FIG. 5 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a set of image data associated with a region of a first image and a set of image data associated with a region of a second image, wherein the region of the first image and the region of the second image comprise an overlapping portion of the first image and the second image;
   receiving an indication of a plurality of bands associated with the overlapping portion of the first image and the second image;
   modifying a number of bands included within the plurality of bands,
   following modification of the number of bands within the plurality of bands, determining a bandwidth associated with a final band within the plurality of bands;
   calculating, for each band within the plurality of bands, a laplacian image;
   applying a linear blending mask to a laplacian image associated with the final band within the plurality of bands to form a blended image associated with the final band;
   applying a laplacian of a Gaussian blending mask to each laplacian image associated with each band within the plurality of bands except for the final band to form a plurality of blended images associated with the plurality of bands; and
   combining the plurality of blended images associated with the plurality of bands with the blended image associated with the final band.

2. A method according to claim 1, wherein determining the bandwidth for the final band comprises calculating the bandwidth based at least in part on a predetermined sharpness factor.

3. A method according to claim 1, wherein applying the laplacian of Gaussian blending mask to each laplacian image associated with each band within the plurality of band except for the final band to form a plurality of blended images comprises blurring a binary mask with a Gaussian kernel, wherein the Gaussian kernel is associated with a predetermined set of parameters.

4. A method according to claim 3, wherein the predetermined set of parameters comprises a mean parameter and a variance parameter.

5. A method according to claim 3, further comprising dividing the blurred binary mask into a first resolution and a second resolution.

6. A method according to claim 1, wherein the indication of the plurality of bands is a predetermined number of bands.

7. A method according to claim 1 wherein combining the plurality of blended images associated with the plurality of bands with the blended image associated with the final band comprises upscaling and summing the blended images.

8. An apparatus comprising at least one processor and at least one memory storing computer program code, the at least one memory and the computer program code configured to, with the processor, cause the apparatus to at least:

receive an indication of a plurality of bands associated with an overlapping portion of a first image and a second image;

modify a number of bands included within the plurality of bands;

following modification of the number of bands within the plurality of bands, determine a bandwidth associated with a final band within the plurality of bands;

calculate, for each band within the plurality of bands, a laplacian image;

apply a linear blending mask to a laplacian image associated with the final band within the plurality of bands to form a blended image associated with the final band;

apply a laplacian of a Gaussian blending mask to each laplacian image associated with each band within the plurality of bands except for the final band to form a plurality of blended images associated with the plurality of bands; and combine the plurality of blended images associated with the plurality of bands with the blended image associated with the final band.

9. An apparatus according to claim 8, wherein causing the apparatus to determine the bandwidth for the final band comprises causing the apparatus to calculate the bandwidth based at least in part on a predetermined sharpness factor.

10. An apparatus according to claim 8, wherein causing the apparatus to apply the laplacian of Gaussian blending mask to each laplacian image associated with each band within the plurality of band except for the final band to form a plurality of blended images comprises causing the apparatus to blur a binary mask with a Gaussian kernel, wherein the Gaussian kernel is associated with a predetermined set of parameters.

11. An apparatus according to claim 10, wherein the predetermined set of parameters comprises a mean parameter and a variance parameter.

12. An apparatus according to claim 10, wherein the at least one memory and the computer program code are configured to, with the processor, further cause the apparatus to divide the blurred binary mask into a first resolution and a second resolution.

13. An apparatus according to claim 8, wherein the indication of the plurality of bands is a predetermined number of bands.

14. An apparatus according to claim 8, wherein causing the apparatus to combine the plurality of blended images associated with the plurality of bands with the blended image associated with the final band comprises causing the apparatus to upscale and sum the blended images.

15. A computer program product comprising at least one non-transitory computer-readable storage medium having computer-executable program code instruction stored therein, the computer-executable program code instructions comprising program code instructions configured, upon execution by at least one processor, to:

receive an indication of a plurality of bands associated with an overlapping portion of a first image and a second image;

modify a number of bands included within the plurality of bands;

following modification of the number of bands within the plurality of bands, determine a bandwidth associated with a final band within the plurality of bands;

calculate, for each band within the plurality of bands, a laplacian image;

apply a linear blending mask to a laplacian image associated with the final band within the plurality of bands to form a blended image associated with the final band;

apply a laplacian of a Gaussian blending mask to each laplacian image associated with each band within the plurality of bands except for the final band to form a plurality of blended images associated with the plurality of bands; and combine the plurality of blended images associated with the plurality of bands with the blended image associated with the final band.

16. A computer program product according to according to claim 15, wherein determining the bandwidth for the final band comprises calculating the bandwidth based at least in part on a predetermined sharpness factor.

17. A computer program product according to according to claim 15 wherein applying the laplacian of Gaussian blending mask to each laplacian image associated with each band within the plurality of band except for the final band to form a plurality of blended images comprises blurring a binary mask with a Gaussian kernel, wherein the Gaussian kernel is associated with a predetermined set of parameters, wherein the predetermined set of parameters comprises a mean parameter and a variance parameter.

18. A computer program product according to according to claim 17 wherein the computer-executable program code instructions further comprise program code instructions configured to divide the blurred binary mask into a first resolution and a second resolution.

19. A computer program product according to according to claim 15, wherein the indication of the plurality of bands is a predetermined number of bands.

20. A computer program product according to according to claim 15, combining the plurality of blended images associated with the plurality of bands with the blended image associated with the final band comprises upscaling and summing the blended images.

* * * * *